United States Patent
Hofbauer et al.

(10) Patent No.: US 12,436,241 B2
(45) Date of Patent: Oct. 7, 2025

(54) LASER SCANNER USING MACRO SCANNING STRUCTURE AND A MEMS SCANNING MIRROR

(71) Applicant: Infineon Technologies Austria AG, Villach (AT)

(72) Inventors: Andreas Hofbauer, Zwettl (AT); Marcus Edward Hennecke, Graz (AT); Boris Kirillov, Judendorf-Straßenge (AT); Rainer Reichert, Horn (AT)

(73) Assignee: Infineon Technologies Austria AG, Villach (AT)

( * ) Notice: Subject to any disclaimer, the term of this patent is extended or adjusted under 35 U.S.C. 154(b) by 980 days.

(21) Appl. No.: 17/539,404

(22) Filed: Dec. 1, 2021

(65) Prior Publication Data

US 2023/0168349 A1 Jun. 1, 2023

(51) Int. Cl.
| | |
|---|---|
| *G01S 7/481* | (2006.01) |
| *G02B 26/08* | (2006.01) |
| *G02B 26/10* | (2006.01) |

(52) U.S. Cl.
CPC ........ *G01S 7/4817* (2013.01); *G02B 26/0833* (2013.01); *G02B 26/101* (2013.01)

(58) Field of Classification Search
CPC ...... G01S 7/4817; G01S 7/4815; G01S 17/42; G01S 17/08; G02B 26/0833; G02B 26/101; G02B 26/105
See application file for complete search history.

(56) References Cited

U.S. PATENT DOCUMENTS

| | | | | |
|---|---|---|---|---|
| 10,007,001 | B1 * | 6/2018 | LaChapelle | G01S 7/484 |
| 10,551,501 | B1 * | 2/2020 | LaChapelle | G01S 7/4818 |
| 11,808,855 | B2 * | 11/2023 | Ikeoh | G02B 26/101 |
| 2020/0200877 | A1 * | 6/2020 | Yoo | G01S 7/4817 |

(Continued)

FOREIGN PATENT DOCUMENTS

| | | |
|---|---|---|
| WO | 2019165294 A1 | 8/2019 |
| WO | 2020245655 A1 | 12/2020 |

OTHER PUBLICATIONS

Maksymova et al. doc.( "Detection and Compensation of Periodic Jitters of Oscillating MEMS Mirrors used in Automotive Driving Assistance Systems") (Year: 2019).*

*Primary Examiner* — Assres H Woldemaryam
(74) *Attorney, Agent, or Firm* — Harrity & Harrity, LLP

(57) ABSTRACT

A light scanning system includes a transmitter configured to transmit a transmit light beam along a transmission path; a microelectromechanical system (MEMS) mirror arranged on the transmission path and configured to oscillate about a first scanning axis to steer the transmit light beam in a first dimension; a macro scanner arranged on the transmission path and on a receiver path, the macro scanner configured to rotate about a second scanning axis to steer the transmit light beam in a second dimension, where the macro scanner is further configured to receive a receive light beam that is produced from the transmit light beam via backscattering, and where the macro scanner is configured to direct the receive light beam further along the receiver path; and a photodetector configured to receive the receive light beam from the macro scanner and generate a measurement signal representative of the receive light beam.

20 Claims, 9 Drawing Sheets

(56) References Cited

U.S. PATENT DOCUMENTS

| | | | |
|---|---|---|---|
| 2020/0200880 A1* | 6/2020 | Stoppel | G01S 7/4814 |
| 2021/0157008 A1* | 5/2021 | Schwarz | G01S 7/4817 |
| 2021/0271072 A1* | 9/2021 | Schroedter | G02B 7/185 |
| 2022/0299609 A1* | 9/2022 | Reichert | H10F 30/225 |

* cited by examiner

LASER SCANNER USING MACRO SCANNING STRUCTURE AND A MEMS SCANNING MIRROR

BACKGROUND

Light Detection and Ranging (LIDAR), is a remote sensing method for determining ranges (variable distances) by targeting an object with light (e.g., laser light) and measuring the time for the reflected light to return to a receiver. Scanning LIDAR sensors probe their surroundings by sequentially scanning the environment using a collimated laser beam and a scanning subsystem with mirrors or prisms. The advantage of using light that is collimated into a small angle is that it greatly extends the range as compared to approaches that flood the entire scene at once (so-called flash LIDAR). The disadvantage is that it takes additional time to scan the scene, particularly if the field of view extends both horizontally and vertically. The scan time depends on the horizontal and vertical field of view as well as the horizontal and vertical resolution and the range. The scan time determines the maximum number of frames (full scans) that can be collected per second.

In addition, to improve the signal-to-noise ratio and thus the range it is useful to let the receiver make use of the same scanning subsystem as well. The receiver then essentially "looks" into the same direction that the light was transmitted into the scene. However, such an arrangement requires large scanning subsystems in order to implement a sufficiently large aperture for the receiver. This typically precludes the use of small so-called microelectromechanical system (MEMS) mirrors from being used in such a system.

Therefore, to achieve a desired horizontal and vertical field of view, horizontal and vertical resolution, scanning range, and frame rate, an improved device is provided having a macroscopic polygon mirror or macroscopic prism and a MEMS mirror arranged in such a way that a horizontal and vertical laser scan pattern is implemented and in such a way that the macroscopic scanning mechanism is also used for the receiver.

SUMMARY

Embodiments provide a light scanning system, including: a transmitter configured to transmit a transmit light beam along a transmission path; a microelectromechanical system (MEMS) mirror arranged on the transmission path and configured to oscillate about a first scanning axis to steer the transmit light beam in a first dimension of a field of view; a macro scanner arranged on the transmission path and on a receiver path, the macro scanner configured to rotate about a second scanning axis to steer the transmit light beam in a second dimension of the field of view, wherein the macro scanner is further configured to receive from the field of view a receive light beam that is produced from transmit light beam via backscattering, and wherein the macro scanner is configured to direct the receive light beam further along the receiver path; and a photodetector arranged on the receiver path and configured to receive the receive light beam from the macro scanner and generate a measurement signal representative of the receive light beam.

Embodiments further provide a light scanning system, including: a plurality of light sources configured to simultaneously transmit a plurality of light beams along a transmission path to produce a fan of transmit light beams; a microelectromechanical system (MEMS) mirror arranged on the transmission path and configured to oscillate about a first scanning axis to steer the fan of transmit light beams in a first dimension of a field of view; a macro scanner arranged on the transmission path and on a receiver path, the macro scanner configured to rotate about a second scanning axis to steer the fan of transmit light beams in a second dimension of the field of view, wherein the macro scanner is further configured to receive from the field of view a fan of receive light beams that is produced from the fan of transmit light beams via backscattering, and wherein the macro scanner is configured to direct the fan of receive light beams further along the receiver path; and an array of photodetectors arranged on the receiver path and configured to receive the fan of receive light beams from the macro scanner and generate a plurality of measurement signals based on the fan of receive light beams.

DETAILED DESCRIPTION

Figure 1A:
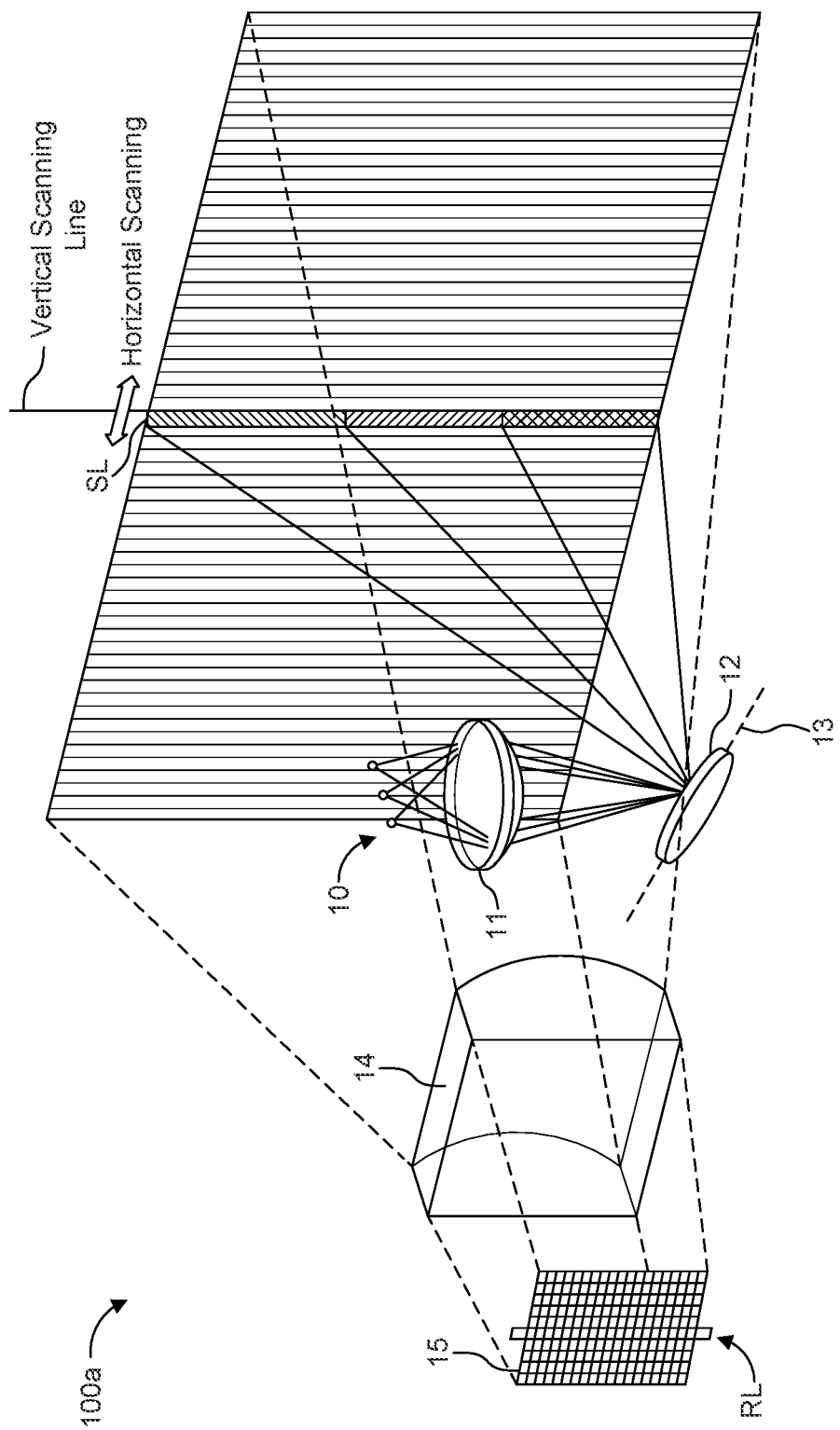
FIG. 1A is a schematic diagram of a horizontal LIDAR scanning system.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems. A sensor may refer to a component which converts a physical quantity to be measured to an electrical signal, for example a current signal or a voltage signal. The physical quantity may, for example, comprise electromagnetic radiation, such as visible light, infrared (IR) radiation, or other type of illumination signal, a current, or a voltage, but is not limited thereto.

Specifically, the embodiments are directed to a Light Detection and Ranging (LIDAR) system having a macroscopic scanning mechanism and a microelectromechanical system (MEMS) mirror arranged in such a way that a horizontal and vertical laser scan pattern is implemented and in such a way that the macroscopic scanning mechanism is also used for the receiver. The macroscopic scanning mechanism can be a prismatic or pyramidal polygon mirror, an oscillating mirror, a nutating mirror, a scan mechanism using diffractive optical elements, but is not limited thereto. In addition, the laser beam is shaped into a fan or a bar of multiple beams and the receiver is built to contain an array of detectors so as to perform multiple measurements at once (i.e., in parallel).

In LIDAR systems, a light source transmits light into a field of view (FOV) and the light reflects from one or more objects by backscattering. The transmitting light may be pulsed light or a continuous wave, for example. In particular, LIDAR is a Time-of-Flight (TOF) system in which the light (e.g., laser beams of infrared light) is emitted into the field of view, and a pixel array detects and measures the reflected beams. For example, an array of photodetectors receives reflections from objects illuminated by the light.

Currently, a photodetector array may be used to measure the reflected light. The photodetector array may be an array that consists of multiple rows and/or multiple columns of photodetectors (pixels). Each photodetector row, photodetector column, or group of adjacent photodetectors may be readout as a measurement signal in the form of raw analog data. Each measurement signal may include data from a corresponding photodetector or group of photodetectors.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance. In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm.

A scan such as an oscillating horizontal scan (e.g., from left to right and right to left in a field of view) can illuminate a scene in a continuous way. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used. As noted above, the transmitted light could also be a continuous wave and other means of calculating time-of-flight is possible.

FIG. 1A is a schematic diagram of a LIDAR scanning system 100*a* that performs horizontal scanning. The LIDAR scanning system 100*a* is an optical scanning device that includes a transmitter, including an illumination unit 10, a transmitter optics 11, and a one-dimensional (1D) MEMS mirror 12 (1D MEMS scanner), and a receiver, including a primary optics 14, and an optical receiver 15. The optical receiver 15 in the illustration is a 2D photodetector array 15. The receiver may further include receiver circuitry, such as data acquisition/readout circuitry and data processing circuitry, as will be further described according to FIG. 2. The LIDAR scanning system 100*a* uses pulsed modulation, similar to the LIDAR technique described above, to measure a distance to a 3D object by measuring the absolute time a light pulse takes to travel from a source into the 3D scene and back, after reflection.

Turning back to FIG. 1A, the photodetector array 15 is arranged in such a manner that an intended field of view is mapped vertically on the vertical extension of the photodetector array 15. A received light beam will hit only a specific row or group or rows of the detector array depending on the vertical angle of the received light beam. The intended field of view is also mapped horizontally on the horizontal extension of a 2D photodetector array.

In particular, a transmitter field of view may comprise of a plurality of discrete transmission angle regions that originate from the transmitter (e.g., from the MEMS mirror 12). The center of each discrete angle region represents a transmission angle/direction of the fired laser beam. The MEMS mirror 12 may have a discrete number of transmission positions (i.e., rotation angles), each corresponding to one or more of the discrete transmission angle regions at which light is transmitted. A firing of a light source may be timed to coincide with a specific transmission position of the MEMS mirror 12 or a particular transmission angle region. Thus, each transmission position represents a transmission direction of the fired laser beam and a transmission direction may be adjusted by adjusting a timing of firing a light source to coincide with a transmission position of the MEMS mirror 12.

In the case of horizontal scanning, each discrete transmission angle may be mapped to both a transmission position of the MEMS mirror 12 and one or more pixel columns of the photodetector array 15. Thus, light transmitted at a particular transmission angle region should be incident on the corresponding mapped pixel column or columns of the photodetector array 15. Consequently, each light source (i.e., each laser channel) has a transmission timing that is mapped to a particular transmission angle region or transmission position and that is further mapped to a pixel column or columns of the photodetector array 15.

Each light source is also mapped to pixel row or a group of pixel rows of the photodetector array 15. Thus, individual pixels may be activated based on a light source and a firing thereof, which coincides with a particular transmission angle region. As a result, each pixel of the photodetector array 15 is mapped to a light source and to a particular transmission angle region, where the particular transmission angle region is mapped to specific transmission position of the MEMS mirror 12.

Mappings may exist for each light source and for each pixel. Each mapping may be stored in memory of the system controller 23 (see FIG. 2), for example, in the form of a look-up table. Calibrating the transmitter and/or the receiver may include updating mapping information stored in one or more look-up tables.

In this example, the illumination unit 10 includes three light sources (e.g., laser diodes or light emitting diodes) that are linearly aligned in single bar formation and are configured to transmit light used for scanning the field of view for objects. The light sources may be fired as a single unit (i.e., simultaneously as a single laser diode) or at different timings as separate laser diodes.

The light emitted by the light sources is typically infrared light although light with another wavelength might also be used. As can be seen in the embodiment of FIG. 1A, the shape of the light emitted by the light sources is spread in a direction perpendicular to the transmission direction to form a light beam with an oblong shape perpendicular to a transmission direction. The illumination light transmitted from the light sources are directed towards the transmitter optics 11 configured to focus each laser onto a MEMS mirror 12 that scans in one dimension. The transmitter optics 11 may be, for example, a lens or a prism.

When reflected by the MEMS mirror 12, the light from the light sources are aligned vertically to form, for each emitted laser shot, a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple vertical segments, where each vertical segment corresponds to a respective light source. However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view. The scanning line SL may also be referred as a fan of laser beams.

It is also noted that a horizontal width of each laser beam corresponds to a discrete angle region at which the laser beam is projected into the field of view in the horizontal direction. The width of each beam may correspond to the width of one pixel column of the photodetector array 15. However, it is more preferable that the width of each beam, and thus the discrete angle region at which the laser beam is projected, be smaller than the width of one pixel column.

Accordingly, the transmitter of the system 100a is an optical arrangement configured to generate laser beams based on the laser pulses, the laser beams having an oblong shape extending in a direction perpendicular to a transmission direction of the laser beams. As can be seen from FIG. 1A, each of the light sources is associated with a different vertical region in the field of view such that each light source illuminates a vertical scanning line only into the vertical region associated with the light source. For example, the first light source illuminates into a first vertical region and the second light sources illuminates into a second vertical region which is different from the first vertical region.

In addition, while three laser sources are shown, it will be appreciated that the number of laser sources are not limited thereto. For example, the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 is built from the same semiconductor substrate that forms the chip. In this way, the mirror body of the MEMS mirror 12 and the chip are formed as a single member having a one-piece integral construction. A reflective coating can then be applied to the mirror body to form a mirror surface. In contrast, a macro scanning mirror is larger in scale than a MEMS mirror and has multiple mechanical parts (i.e., it does not have a one-piece integral construction).

The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Due to this single scanning axis of rotation, the MEMS mirror 12 is referred to as a 1D MEMS mirror or 1D MEMS scanner.

The MEMS mirror 12 is configured to oscillate "side-to-side" about a single scanning axis 13 such that the light reflected from the MEMS mirror 12 (i.e., the vertical scanning line of light) oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge.

Thus, the field of view is scanned in the horizontal direction by the vertical bar of light by changing the angle of the MEMS mirror 12 on its scanning axis 13. For example, the MEMS mirror 12 may be configured to oscillate between +/−15 degrees in a horizontal scanning direction to steer the light over +/−30 degrees (i.e., 60 degrees) making up the horizontal scanning range of the field of view. Thus, the field of view may be scanned, line-by-line, by a rotation of the MEMS mirror 12 though its degree of motion. One such sequence though the degree of motion (e.g., from −15 degrees to +15 degrees or vice versa) is referred to as a single scan. Thus, two consecutive scans are used for each scanning period. Multiple scans may be used to generate distance and depth maps, as well as 3D images by a processing unit. The horizontal resolution of the depth maps and images depends on the size of the incremental steps in rotation angle of the MEMS mirror 12 taken between scans as well as the horizontal beam divergence of the laser transmitter.

It will be appreciated that the degree of rotation is not limited to +/−15 degrees, and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis.

Upon impinging one or more objects, the transmitted bar of vertical light is reflected by backscattering back towards the LIDAR scanning system 100a as a reflected vertical line where the second optical component 14 (e.g., a lens or prism) receives the reflected light. The second optical component 14 directs the reflected light onto the photodetector array 15 that receives the reflected light as a receiving line RL and is configured to generate electrical measurement signals. The electrical measurement signals may be used for generating a 3D map of the environment and/or other object data based on the reflected light (e.g., via TOF calculations and processing).

The receiving line RL is shown as a vertical column of light that extends along one of the pixel columns in a lengthwise direction of the pixel column. The receiving line has three vertical regions that correspond to the vertical regions of the vertical scanning line SL shown in FIG. 1A. As the vertical scanning line SL moves horizontally across the field of view, the vertical column of light RL incident on the photodetector array 15 also moves horizontally across the photodetector array 15. The reflected light beam RL moves from a first edge of the photodetector array 15 to a second edge of the photodetector detector array 15 as the receiving direction of the reflected light beam RL changes. The receiving direction of the reflected light beam RL corresponds to a transmission direction of the scanning line SL. Thus, LIDAR transmitters may fire light as a narrow laser pulse at different positions in a field of view, where each firing position corresponds to a pixel column of the photodetector array 15.

The photodetector array 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 15 is a two-dimensional (2D) APD array that comprises an array of APD pixels. The activation of the photodiodes may be synchronized with light pulses emitted by the illumination unit 10.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance measurement, processing circuitry, such as a microcontroller, a field programmable logic arrays (FPGA), or a processor, triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by one or more receiving photodiodes of the photodetector array 15. Each receiving photodiode emits a short electrical pulse that is read out by the analog readout circuit. Each signal that is read out of the analog readout circuit may be amplified by an electrical signal amplifier.

A comparator IC recognizes the pulse and sends a digital signal to the TDC to stop the timer. The TDC uses a clock frequency to calibrate each measurement. The TDC sends the serial data of the differential time between the start and stop digital signals to the processing circuitry, which filters out any error reads, averages multiple time measurements, and calculates the distance to the target at that particular field position. By emitting successive light pulses in different directions established by the MEMS mirror 12, an area (i.e., a field of view) can be scanned, a three-dimensional image can be generated, and objects within the area can be detected.

The signal processing chain of the receiver may also include an ADC for each photodiode or for a group of photodiodes. The ADC is configured to convert the analog electrical signals from the photodiodes or group of photodiodes into a digital signal that is used for further data processing.

In addition, instead of using the TDC approach, ADCs may be used for signal detection and ToF measurement. For example, each ADC may be used to detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

When a pulse of laser energy as a vertical scanning line SL enters the field of view from the surface of MEMS mirror 12, reflective pulses appear when the laser light illuminates an object in the field of view. These reflective pulses arrive at the photodetector array 15 as a vertical column of light that may, for example, have the width of one photodetector pixel and a length that spans vertically at least partially along a pixel column of the photodetector array 15 in a lengthwise direction.

The photodetector array 15 is configured to generate measurement signals (electrical signals) used for generating a 3D map of the environment based on the reflected light (e.g., via TOF calculations and processing). For example, as noted above, the photodetector array 15 may be an array of photodiodes or other light detection component capable of detecting and measuring light, and generating electrical signals therefrom.

While not shown in FIG. 1A, the LIDAR scanning system 100a may also include a macro scanning mirror or other macro scanning structure used to steer the light beams in the vertical direction while the MEMS mirror 12 is used to steer the light beams in the horizontal direction.

Figure 1B:
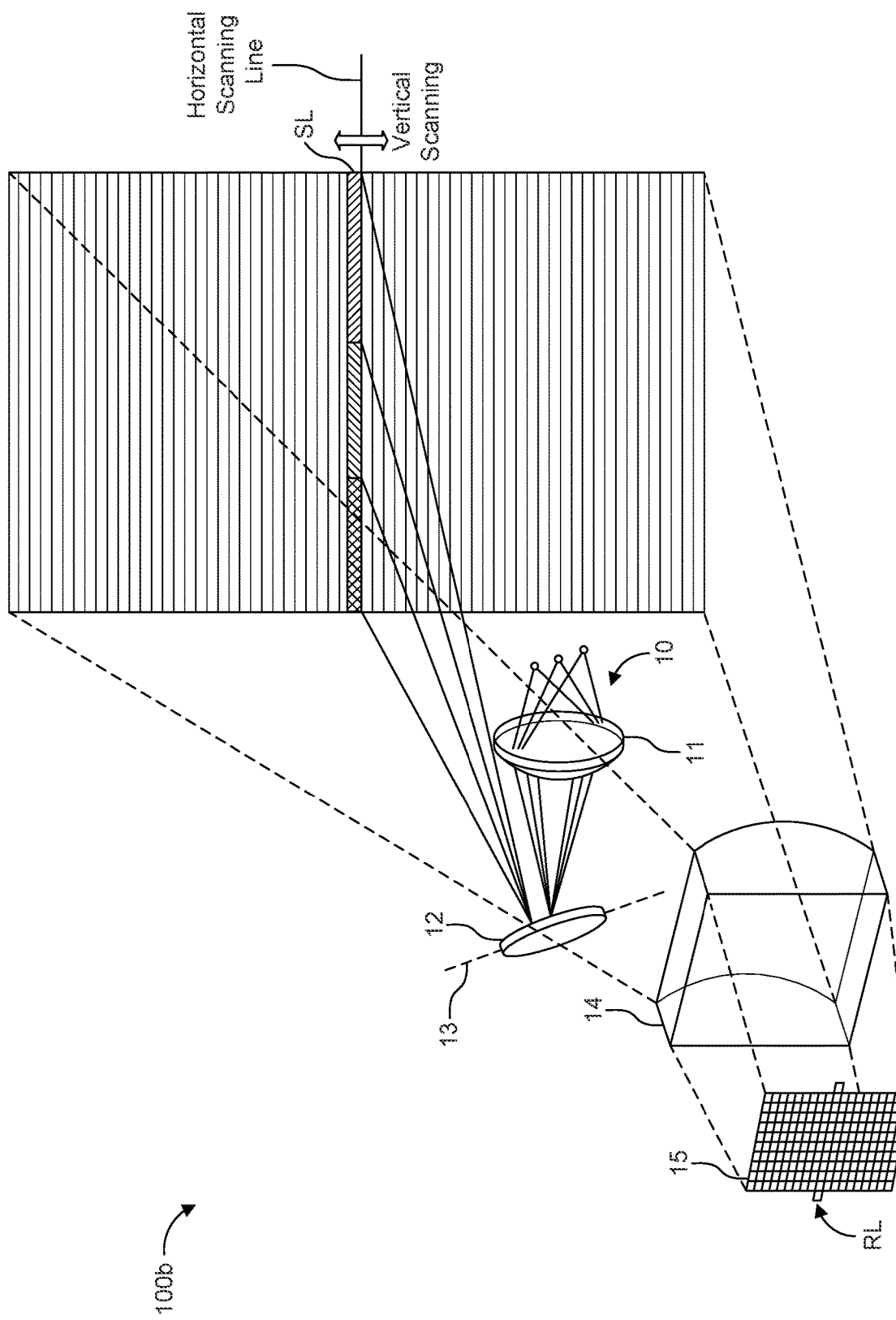
FIG. 1B is a schematic diagram of a vertical LIDAR scanning system.

FIG. 1B is a schematic diagram of a vertical LIDAR scanning system 100b that performs vertical scanning in accordance with one or more embodiments. In particular, the LIDAR scanning system 100b is similar to the LIDAR scanning system 100a, with the exception that the scanning direction is rotated 90° such that the scanning line SL and the receiving line RL move in the vertical direction (i.e., from top to bottom or from bottom to top). As such, the scanning line is a horizontal scanning line SL that is projected into the field of view that moves vertically across the field of view as the transmission mirror oscillates about the single scanning axis. Furthermore, as the horizontal scanning line SL moves vertically across the field of view, the horizontal column of light RL incident on the photodetector array 15 also moves vertically across the photodetector array 15.

While not shown in FIG. 1B, the LIDAR scanning system 100b may also include a macro scanning mirror or other macro scanning structure used to steer the light beams in the horizontal direction while the MEMS mirror 12 is used to steer the light beams in the vertical direction.

It will be appreciated that, while some embodiments are described with reference to using the MEMS mirror 12 for vertical scanning and a macro scanning structure for horizontal scanning, the respective scanning directions can be switched by changing the orientation of their respective scanning axes. In any case, the scanning axis of the MEMS mirror 12 and the scanning axis of the macro scanning structure are substantially orthogonal to each other to achieve scanning in two dimensions.

Figure 2:
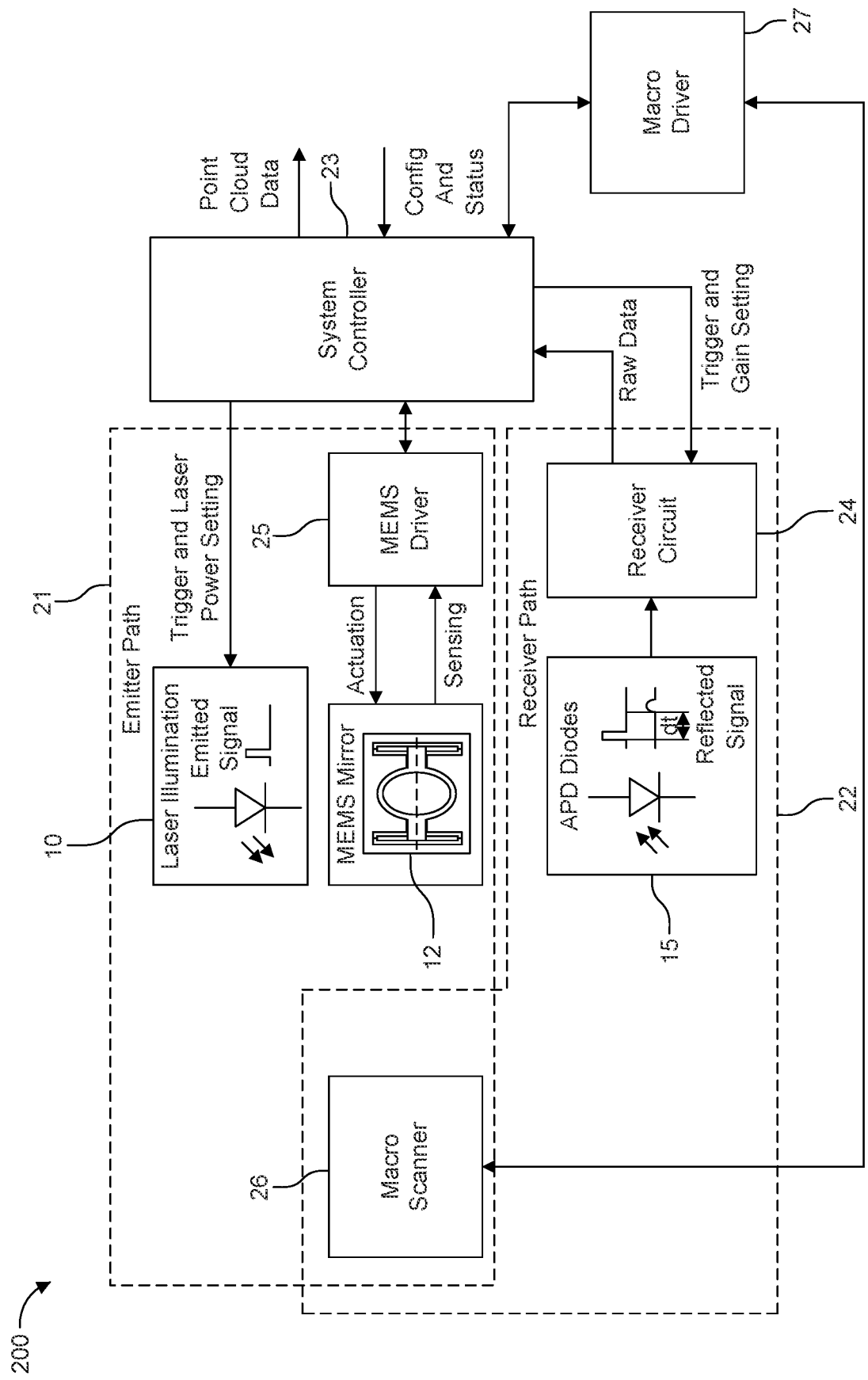
FIG. 2 is a schematic block diagram of a LIDAR scanning system in accordance with one or more embodiments.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller. Moreover, in addition to the MEMS mirror 12 shown in FIGS. 1A and 1B, the LIDAR scanning system 200 includes a macro scanner 26 (e.g., a rotating polygon mirror or a rotating prism) that steers light beams in a scanning direction orthogonal to the scanning direction of the MEMS mirror 12. It will be further appreciated that the macro scanner 26 is arranged along both the emitter path (i.e., a transmission path) and the receiver path (i.e., a return path). Thus, the macro scanner 26 has a co-axial relationship with both a transmitted light beam and its reflected light beam that is receive via backscattering.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processing circuitry (e.g., comparators, TDCs, ADCs, FPGAs, and digital signal processors (DSPs)) of a signal processing chain for processing data, as well as control circuitry, such as a microcontroller or a FPGA, that is configured to generate control signals. The control circuitry may also be incorporated as part of the processing circuitry.

The transmitter unit 21 includes the illumination unit 10, the MEMS mirror 12, a MEMS driver 25 configured to drive the MEMS mirror 12, and the macro scanner 26.

The MEMS driver 25 actuates and senses the rotation position of the MEMS mirror 12, and provides position information (e.g., tilt angle or degree of rotation about the rotation axis) of the MEMS mirror 12 to the system controller 23. Based on this position information, the laser sources of the illumination unit 10 are triggered by the system controller 23 and the photodiodes are activated to sense, and thus measure, a reflected light signal. The controller 23 may refer to the relevant mapping information stored in look-up tables for determining a timing to fire a particular light source and a timing to activate a particular photodiode, and transmit control signals to the illumination unit 10 and to the photodetector array 15 accordingly. Thus, a higher accuracy in position sensing of the MEMS mirror results in a more accurate and precise control of other components of the LIDAR system.

A macro driver 27 is also provided to drive the macro scanner 26 about a scanning axis. The macro scanner 26 may be configured to continuously rotate about its scanning axis 28 at a set rotational speed. The macro driver 27 may be configured to measure a rotational speed and/or an absolute rotational angle of the macro scanner 26 using, for example, a speed sensor and/or angle sensor. The macro driver 27 may then provide the rotational speed and/or the absolute rotational angle to the system controller 23, which in turn, ensures that rotational position of the macro scanner 26 is in sync with the desired scanning pattern of the transmitted light beams. The system controller 23 may adjust the rotational speed of the macro scanner 26 based on the received feedback information by controlling the macro driver 27.

The system controller 23 is further configured to control the illumination unit 10, the MEMS mirror 12, and the macro scanner 26 to implement a calibrated scanning technique. The firing of laser beams from the illumination unit 10 is coordinated with at least one of a rotational (angular) position of the MEMS mirror 12 and a rotational position of the macro scanner 26 to transmit laser beams into the field of view based on, for example, a desired timing interval and/or a desired transmission direction. The transmission direction can be an XY coordinate in an XY coordinate plane, including both horizontal and vertical directions.

The receiver unit 22 includes the photodetector array 15, a receiver circuit 24 that includes an analog readout circuit, and the macro scanner 26. It will be appreciated that the macro scanner 26 is part of both the transmitter unit 21 and the receiver unit 22 because a portion of the transmission path and the reception path is shared with the macro scanner 26.

The illumination unit 10 may include N light sources that transmit N light beams (pulses), each corresponding to one of N photodetectors of an N photodetector array. When simultaneously triggered, the N light sources create a wide light beam made by the discrete N light beams being combined. The analog readout circuit includes an analog output channel for each of the N photodetectors. The N analog output channels are configured to read out measurement signals received from a corresponding photodetector of the photodetector array 15.

Thus, the receiver circuit 24 may receive the analog electrical signals from the photodetectors of the photodetector array 15 and transmit the electrical signals as raw analog data to an analog-to-digital converter (ADC). Prior to the ADC receiving the electrical signals, the electrical signals may pass through an amplifier (e.g., a transimpedance amplifier (TIA)) that converts the electrical signals from, for example, current into voltage. The ADC is configured to convert the raw analog data into raw digital data for further processing. The amplifier and/or the ADC may be incorporated in the system controller 23 or the receiver circuit 24, or may be interposed between the receiver circuit 24 and the system controller 23 as separate circuits.

The receiver circuit 24 may also receive trigger control signals from the system controller 23 that triggers an activation of one or more photodetectors. The receiver circuit 24 may also receive gain setting control signals for controlling the gain of one or more photodetectors.

The system controller 23 includes signal processing circuitry that receives the raw digital data as well as serial data of a differential time between start and stop digital signals generated by an ADC, and uses the received data to calculate time-of-flight information for each field position within the field of view, to generate object data (e.g., point cloud data), and to generate a 3D point cloud.

Specifically, the signal processing circuitry of the system controller 23 may be configured to detect an object based on the electrical signals generated by the photodetectors of the photodetector array 15. Based on the detection, the signal processing circuitry may determine an estimated position of the object in the field of view, including direction and depth.

Figure 3A:
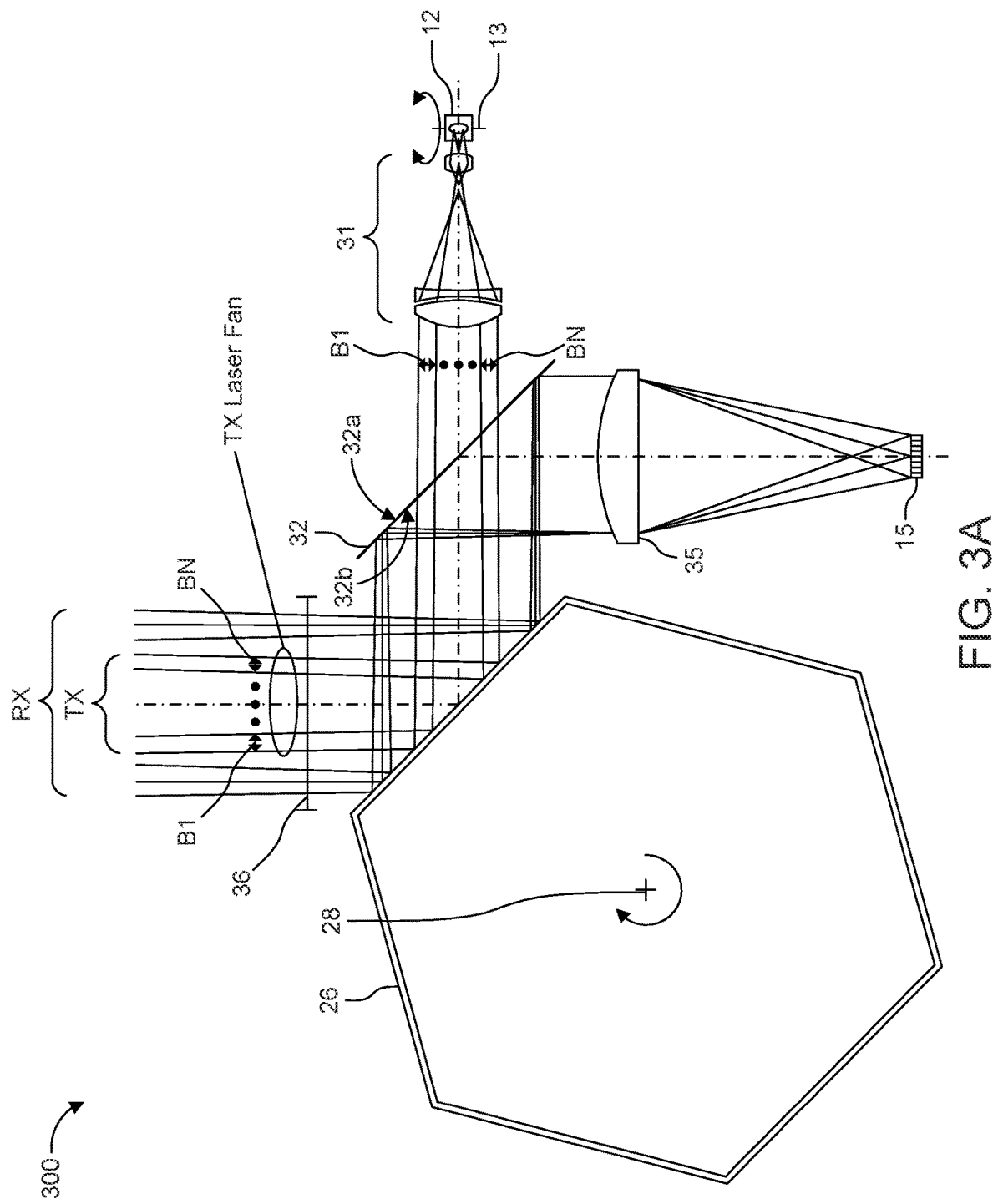
FIG. 3A is a top view of a beam scanning system having both micro and macro scanners according to one or more embodiments.
Figure 3B:
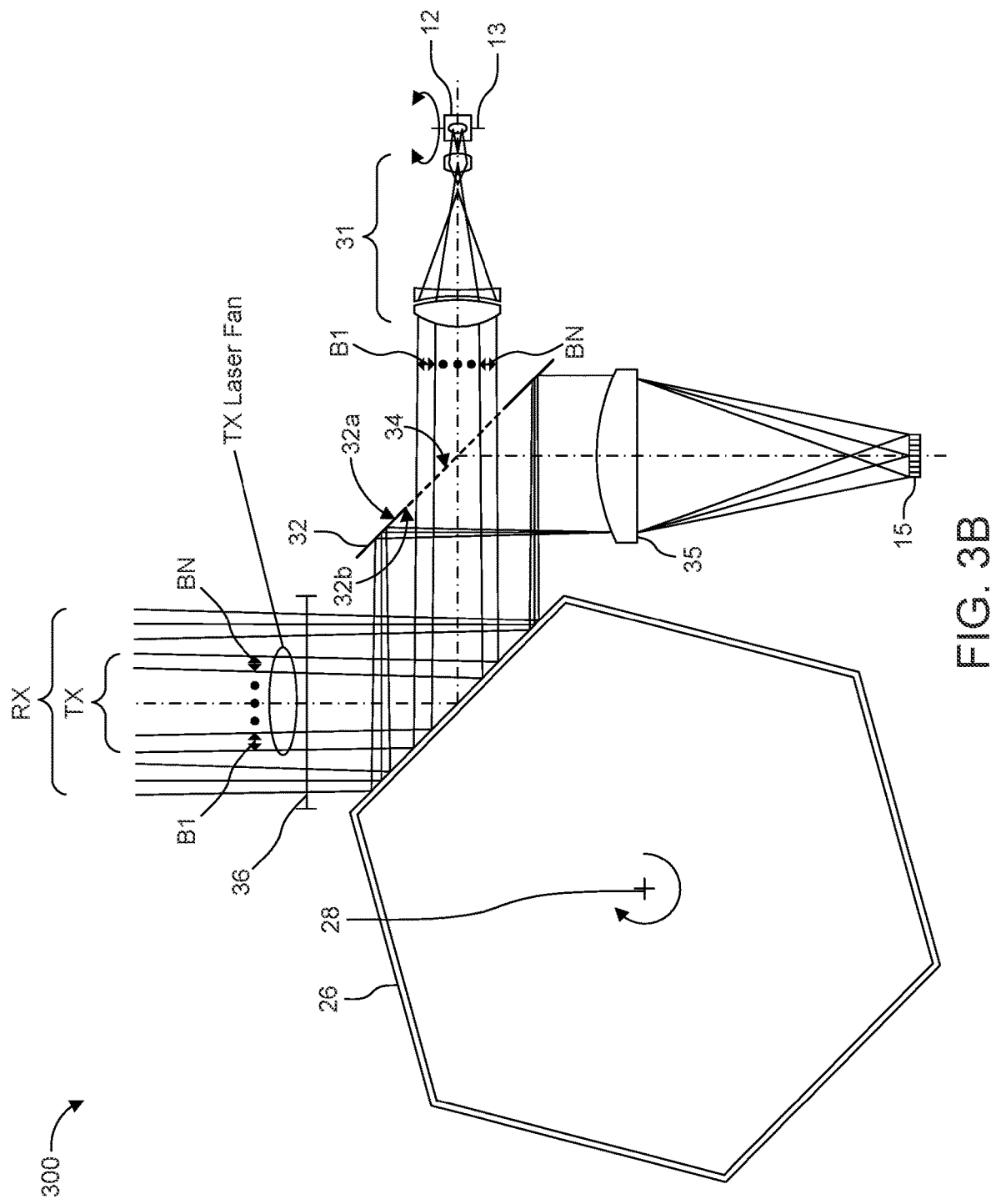
FIG. 3B is a top view of a beam scanning system having both micro and macro scanners according to one or more embodiments.

FIGS. 3A and 3B are a top views of a beam scanning system 300 according to one or more embodiments. FIGS. 3A and 3B are used to illustrate that different arrangements with respect to a receiver mirror 32 are possible. However, in both arrangements, the macro scanner 26 is used for the transmission and reception of light.

The MEMS mirror 12 is a 1D MEMS mirror configured to oscillate about its scanning axis 13 at a high frequency (e.g., a resonance frequency of 2 kHz). In this example, the MEMS mirror 12 is used for vertical scanning such that multiple light beams are steered according to a vertical beam angle. As only the outgoing laser light is being deflected, a comparatively small MEMS mirror is sufficient to transmit the light power. This enables a small form factor.

In contrast, the macro scanner 26 is a polygon mirror that continuously rotates 360° about its scanning axis 28, which is orthogonal to scanning axis 13. Each surface of the macro scanner 26 is a reflective surface configured to direct the light beams into the field of view. In this example, the macro scanner 26 is used for horizontal scanning such that the multiple light beams are steered according to a horizontal beam angle. The macro scanner 26 is also used for receiving reflected, backscattered light beams from the field of view and directing them along a receiver path towards the photodetector array 15. The MEMS mirror 12 is configured to receive a fan of laser beams from the illumination unit 10 and steer the fan of laser beams at a vertical deflection angle or tilt angle according to its rotational position about its scanning axis 13. The illumination unit 10 is configured to transmit the fan of laser beams at a trigger time controlled by the system controller 23, where the trigger time corresponds to a desired vertical deflection angle. The fan of laser beams could be implemented as a set of individual beams or as a continuous line. In this example, the fan of laser beams is made up of 16 individual beams produced by 16 light sources. Alternatively, the macro scanner 26 could be a pyramidal polygon mirror, an oscillating mirror, a nutating mirror, or a scan mechanism using diffractive optical elements.

The MEMS mirror 12 is configured to deflect the fan of laser beams towards post-scan optics 31. The post-scan optics 31 may include a beam collimator that is configured to receive the fan of laser beams and convert the diverging beams into a wider beam of parallel beams by collimating the light received from the MEMS mirror 12 and pass the wider beam to a receiver mirror 32. Here, beam B1 and beam BN of an N beam system are shown, with the ellipsis representing beams therebetween. Together, beams B1-BN combine to form the laser fan of N beams. In an alternative embodiment, such as a biaxial system, a receiver mirror may not be required.

In general, the post-scan optics 31 refocuses the laser fan onto the macro scanner 26. The laser light may travel through the receiver mirror 32 through a one or more holes in the receiver mirror 32. Alternatively, the laser fan may travel above or below the receiver mirror 32, thereby bypassing the receiver mirror 32 entirely.

A beam splitter is an optical device that splits a beam of light (i.e., incident light) in two, which may or may not have the same optical power (i.e., signal strength). For example, incident light, whether it be transmission (TX) light received from the MEMS mirror 12 or received (RX) light from the environment via the macro scanner 26, may be split into transmitted light that is passed through at the same angle as the incident light and into reflected light that is reflected at a different angle (e.g., typically at 45° which results in a 90° deflection from the transmitted beam). The reflectivity of the main body of the beam splitter is configurable. For example, the main body of the beam splitter may be 5% reflective, resulting in 5% of the incident light being reflected and 95% of the incident light being transmitted therethrough. Thus, it can be said that the main body of a beam splitter has a reflectivity of X %, where X is any number greater than zero.

For example, the receiver mirror 32 may be a plate beam splitter, as shown in FIG. 3A, where its main body is a plate or substrate, which may be a dielectric mirror, thin-film polarizer, dichroic mirror, or the like. The main body may be a glass substrate or other material that provides the desired reflectivity of X %.

As a beam splitter, the receiver mirror 32 has a transmitter (TX) side having a first main surface 32a that is arranged to receive transmission light from the MEMS mirror 12 and the beam splitter is configured pass a percentage of the transmission light to the macro scanner 26. The beam splitter has a receiver (RX) side having a second main surface 32b that is arranged to receive light from the macro scanner 26 (i.e., received from the environment) and direct a portion of the RX light towards the photodetector 15. Thus, the beam splitter is arranged in a transmit beam path of a TX light beam and in a receive beam path of a RX light beam.

In addition, the beam splitter includes a reflective coating disposed onto the second main surface 32b of the beam splitter at the RX side. The reflective coating may be a mirror coating or a mirror substrate that has 100% reflectivity. That is, it reflects 100% of the light incident thereon (i.e., 100% or an entire portion of the RX light beam). It will be appreciated that the reflective coating may have a reflectivity of less than 100% in some configurations or in other embodiments described herein.

The receiver mirror 32 in FIG. 3B includes at least one aperture 34 that is defined in the main body of the receiver mirror 32. That is, the apertures 34 may be small holes that extend from the first main surface 32a to the second main surface 32b and exposes the second main surface of the beam splitter at the RX side, thereby allowing TX light to pass through the receiver mirror 32 from the TX side towards the macro scanner 26.

An aperture 34 may be a rectangular slit or stripe to enable a passage of the fan of laser light from the TX side therethrough. Thus, the aperture 34 may have an elongated rectangular slit or stripe shape in order to match the shape of the laser light.

The rotating macro scanner 26 deflects the laser fan out into the scene, implementing a horizontal scan. The outgoing laser fan is made up of N beams that are horizontally arranged with respect to each other. In other words, wherein the laser fan is a line (e.g., a horizontal scanning line SL) having an elongated dimension that extends in the horizontal dimension and whose trajectory is steered according to the vertical and horizontal beam angles directed by the MEMS mirror 12 and macro scanner 26, respectively. As the light returns from the scene the macro scanner 26 deflects the light back onto the receiver mirror 32 from where it is deflected through receiver optics 35 onto the photodetector array 15. The large aperture 36 of the macro scanner 26 ensures that a large amount of light is captured to enable a long range.

The aperture 36 of the macro scanner 26 refers to the width in the horizontal dimension of a receiving reflective surface of the macro scanner 26. The size of the aperture 36 corresponds to the amount of light that can be received from the scene and directed at the receiver mirror 32. The size of the aperture 36 can change as the angle of the receiving reflective surface changes during rotation of the macro scanner 26. The size of the aperture 36 is always significantly larger than the size of the MEMS mirror 12. As a result, the transmitted fan of laser beams TX is smaller than the received fan of laser beams RX. If the macro scanner 26 is used for vertical scanning, the aperture 36 of the macro scanner 26 would refer to the width in the vertical dimension of a receiving reflective surface of the macro scanner 26.

The receiver optics 35 may include a beam collimator that is configured to receive the backscattered fan of laser beams (i.e., the RX light beams) from the receiver mirror 32 and focus the fan of laser beams into a narrower beam onto the photodetector array 15.

The photodetector array 15 includes an array of photodetectors, one photodetector for each laser beam of the fan of laser beams. In particular, the photodetectors are horizontally arranged with respect to each other for the macro scanner 26 that performs horizontal scanning. Each photodetector is mapped to one of the laser beams of the received fan of laser beams. This makes it possible to perform multiple measurements in parallel, up to as many as there are photodetectors.

Figure 4:
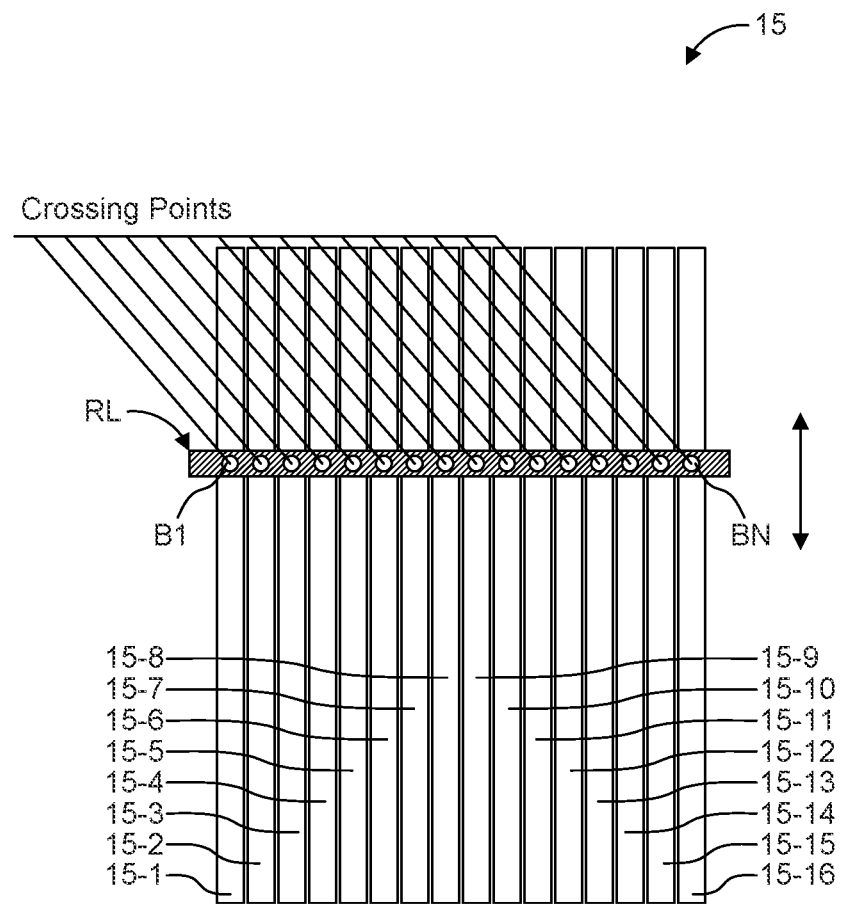
FIG. 4 shows a photodetector array according to one or more embodiments.

FIG. 4 shows the photodetector array 15 according to one or more embodiments, where N=16. Thus, the photodetector array 15 incudes sixteen photodetectors 15-1 to 15-16 as vertical bars that are horizontally arranged in columns. Each photodetector 15-1 to 15-16 is arranged to receive one of the laser beams B1 to BN that makes up the received fan or laser beams (i.e., the receiving line RL). The crossing points of the received fan or laser beams onto the photodetector array 15 are shown. The received fan or laser beams moves vertically across the photodetector array 15 based on the deflection angle of the MEMS mirror 12. The timing of incidence (e.g., with respect to the trigger time of the TX beam) and the detected light intensity at each crossing point can be used by the receiver to determine the directions of distance measurement and thus those points/direction of the scene which are currently acquired.

It is to be noted that there is a limit to how much light power the laser fan can emit into the scene which may be due to thermal limitations or due to eye safety considerations. Thus, it is possible for the system controller 23 to purposefully deactivate some laser beams (i.e., to deactivate some light sources) to increase the power in the remaining laser beams. This can be used to increase the detection range of the system at the expense of a lower resolution.

Figure 5:
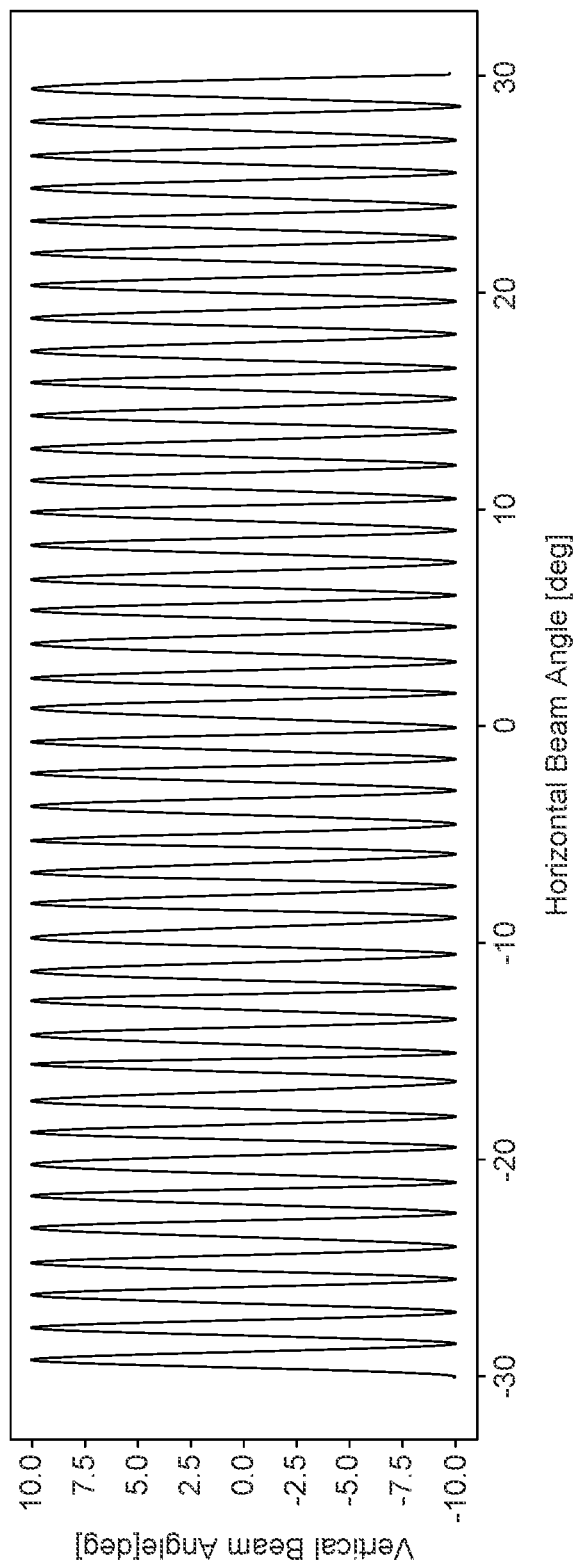
FIG. 5 shows a scanning pattern of laser beams transmitted into the scene according to one or more embodiments.

FIG. 5 shows a scanning pattern of laser beams transmitted into the scene according to one or more embodiments. The scanning pattern shows a trajectory in the field of view according to a horizontal beam angle and a vertical beam angle at the output of the scanning system (e.g., at the output of the macro scanner 26). While the macro scanner 26 rotates about its scanning axis 28, it moves the laser beam from left to right (or vice versa) in a linear fashion, the MEMS mirror 12 moves the laser beam in a sinusoidal up-down, vertical pattern. In this particular case, the field of view covers 60° horizontally and 20° vertically. The figure shows the movements of only one of the beams of the fan of laser beams. In other words, the scanning pattern is illustrative for a single light source that fires consecutive light beams at different trigger times as the beam trajectory changes based on the movement of the MEMS mirror 12 and the macro scanner 26. Thus, the MEMS mirror 12 steers the consecutively fired light beams or consecutively fired laser fans in a sinusoidal pattern and the macro scanner is configured to steer the consecutively fired light beams or the consecutively fired laser fans linearly across the field of view.

Figure 6:
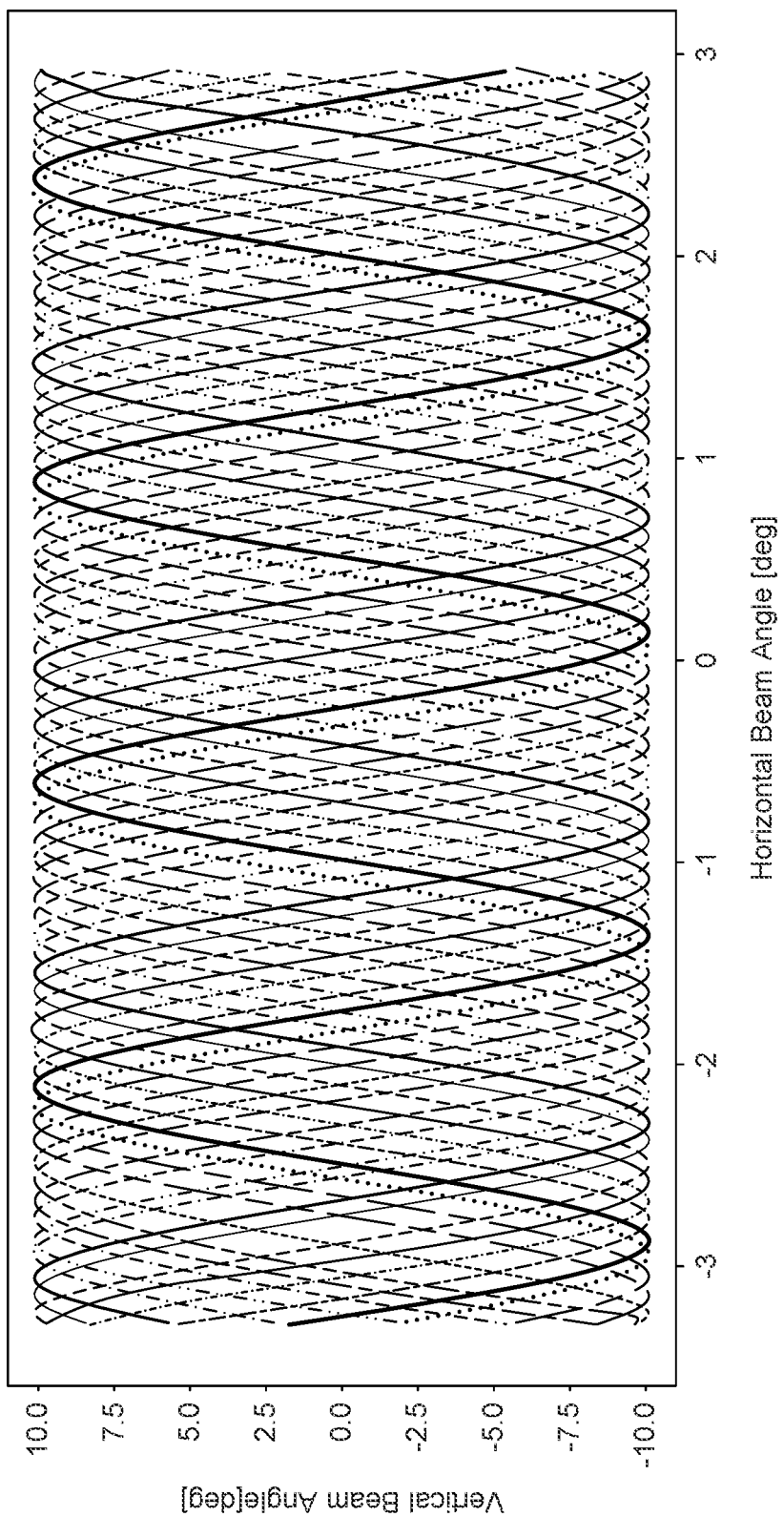
FIG. 6 shows a scanning pattern of a fan of laser beams transmitted into the scene according to one or more embodiments.

FIG. 6 shows a scanning pattern of a fan of laser beams transmitted into the scene according to one or more embodiments. Each of the laser beams of the fan of laser beams follows a similar scanning pattern shown in FIG. 5. However, each laser beam is horizontally shifted from the other laser beams at any given moment. In other words, each laser beam of a fan of laser beams that is transmitted by the macro scanner 26 is directed at a different horizontal beam angle relative to the other laser beams. "Any given moment" refers to a same vertical beam angle or a same laser fan transmission.

For example, when the vertical beam angle is at 0° due to the position of MEMS mirror 12 (i.e., the deflection angle of MEMS mirror 12 about its scanning axis 13 is 0°), each beam within the transmitted fan of laser beams is transmitted at a different horizontal beam angle while being transmitted at a vertical beam angle of 0°. This principle can also be more easily noticed at the 10° and −10° vertical beam angles. The result is a dense scanning pattern.

The use of a laser fan with one MEMS mirror 12 that controls scanning in one dimension and one macro scanner 26 that controls scanning in the other dimension enables both a large field of view and a dense point cloud at the same time.

As noted above, LIDAR systems may use the direct time-of-flight principle. The laser sources shoot very short pulses and the receiver detects the returning pulses. The time it takes for the pulses to return is a measure of the distance. In a scanning LIDAR system, it is important to define the correct times when to trigger the lasers as this determines the directions in which they are transmitted out into the scene.

Figure 7:
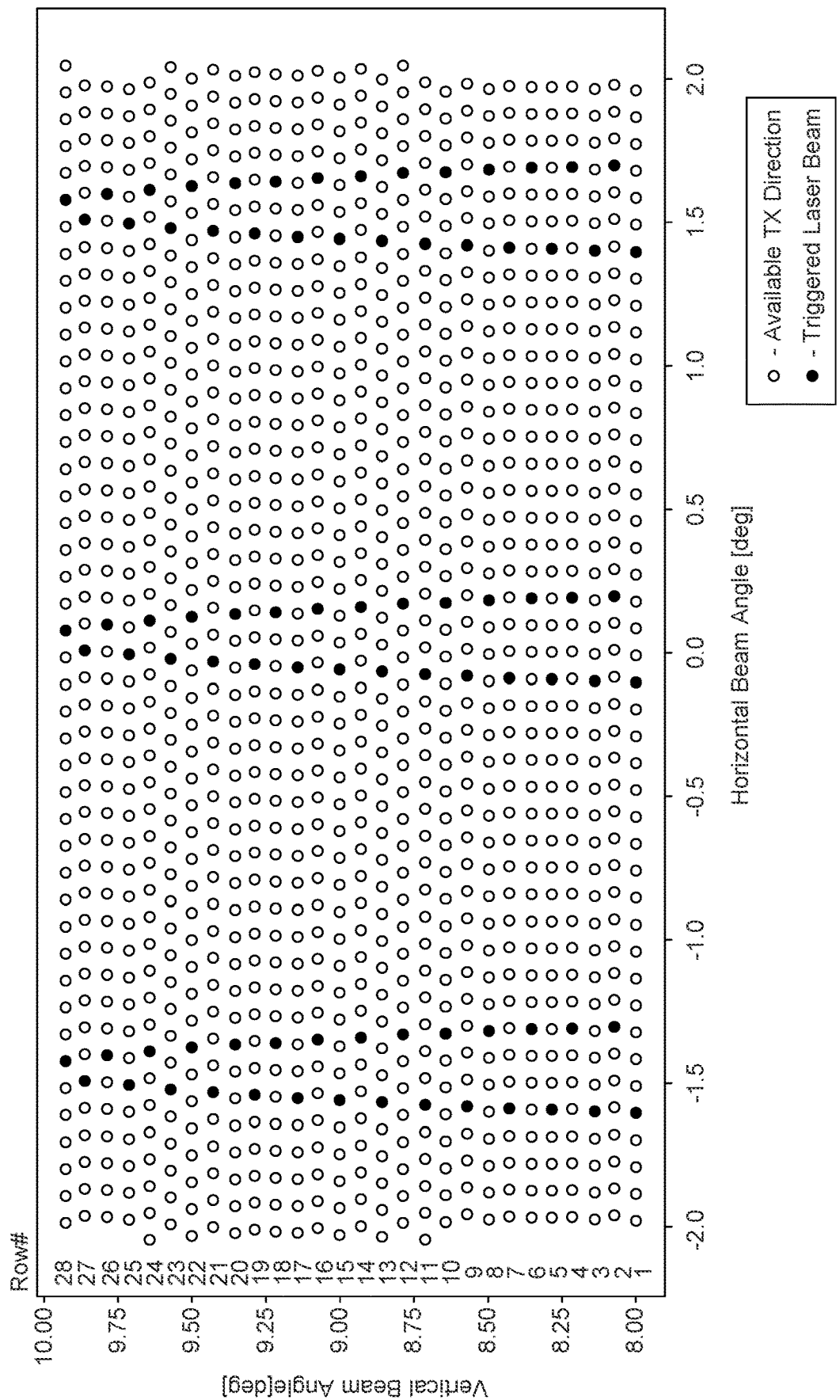
FIG. 7 illustrates a plot of discrete transmission directions in a portion of a field of view according to one or more embodiments.

FIG. 7 illustrates a plot of discrete transmission (TX) directions in a portion of a field of view according to one or more embodiments. Each TX direction has a horizontal beam angle component and a vertical beam angle component. In particular, the plot shows available transmission directions according to a preconfigured scanning pattern. Each available transmission direction corresponds to a trigger time at which the light sources are triggered to produce the laser fan relative to the position of the MEMS mirror 12 and the macro scanner 26 about their scanning axes. The available transmission directions make up a grid of rows and columns.

In addition to available transmission directions, the plot shows positions within the scanning pattern at which a laser beam is triggered. The trigger time also corresponds to the trigger time of the laser fan, but only one laser beam is referenced for the sake of simplicity. As can be seen, the laser beam is triggered only on the even rows during an up scan (i.e., while the MEMS mirror 12 is moving in one rotation direction from −10° to 10°) and the laser beam is triggered only on the odd rows during a down scan (i.e., while the MEMS mirror 12 is moving in one rotation direction from 10° to −10°), or vice versa. This trigger timing pattern implements a much more homogeneous scan pattern and ensures an even sampling of the scene.

In other words, the system controller 23 is configured to realize a scanning pattern comprising a grid of transmission coordinates, the grid of transmission coordinates comprising odd rows and even rows, where each transmission coordinate has a first beam angle component in a first dimension and a second beam angle component in a second dimension. The system controller 23 is configured to control the light unit 10 to transmit a plurality of transmit light beams at different trigger times to transmit the plurality of transmit light beams at different transmission coordinates. Furthermore, the MEMS mirror 12 is configured to oscillate between a first rotation direction and a second rotation direction as it oscillates about its scanning axis 13. The system controller 23 is configured to trigger first transmit light beams of consecutively fired transmit light beams only at first trigger times corresponding to the even rows while the MEMS mirror rotates in the first rotation direction. The system controller 23 is configured to trigger second light beams of consecutively fired transmit light beams only at second trigger times corresponding to the odd rows while the MEMS mirror rotates in the second rotation direction. Consecutively fired transmit light beams may refer to a plurality of laser fans that are fired at different transmission times.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

It is further to be noted that methods disclosed in the specification or in the claims may be implemented by a device having means for performing each of the respective acts of these methods. Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field programmable logic arrays (FPGAs), programmable logic controller (PLC), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. A control unit may use electrical signals and digital algorithms to perform its receptive, analytic, and control functions, which may further include corrective functions. Such hardware, software, and firmware may be implemented within the same device or within separate devices to support the various techniques described in this disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray' disc, a RAM, a ROM, a PROM, an EPROM, an EEPROM, a FLASH memory, or an electronic memory device.

Furthermore, although various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A light scanning system, comprising:
 a transmitter configured to transmit a transmit light beam along a transmission path;
 a microelectromechanical system (MEMS) mirror arranged on the transmission path and configured to oscillate about a first scanning axis to steer the transmit light beam in a first dimension of a field of view;
 a macro scanner arranged on the transmission path and on a receiver path, the macro scanner configured to rotate about a second scanning axis to steer the transmit light beam in a second dimension of the field of view, wherein the macro scanner is further configured to receive from the field of view a receive light beam that is produced from the transmit light beam via backscattering, and wherein the macro scanner is configured to direct the receive light beam further along the receiver path;
 a photodetector arranged on the receiver path and configured to receive the receive light beam from the macro scanner and generate a measurement signal representative of the receive light beam; and
 a receiver mirror arranged on the receiver path between the macro scanner and the photodetector, wherein the receiver mirror is configured to receive the receive light beam from the macro scanner and direct the receive light beam at the photodetector.

2. The light scanning system of claim 1, wherein the macro scanner is a polygon mirror having a plurality of reflective sides or a prism.

3. The light scanning system of claim 1, wherein the macro scanner is configured to continuously rotate 360° about the second scanning axis to steer the transmit light beam in the second dimension.

4. The light scanning system of claim 1, wherein the receiver mirror is arranged on the transmission path between the MEMS mirror and the macro scanner, wherein the transmit light beam is configured to pass through the receiver mirror along the transmission path.

5. The light scanning system of claim 1, further comprising:
a controller configured to configure a scanning pattern comprising a grid of transmission coordinates, the grid of transmission coordinates comprising odd rows and even rows, wherein each transmission coordinate has a first beam angle component in the first dimension and a second beam angle component in the second dimension,
wherein the controller is configured to control the transmitter to transmit a plurality of transmit light beams at different trigger times to transmit the plurality of transmit light beams at different transmission coordinates.

6. The light scanning system of claim 5, wherein:
the MEMS mirror is configured to oscillate between a first rotation direction and a second rotation direction as it oscillates about the first scanning axis,
the controller is configured to trigger first transmit light beams of the plurality of transmit light beams at first trigger times corresponding to the even rows while the MEMS mirror rotates in the first rotation direction, and
the controller is configured to trigger second light beams of the plurality of transmit light beams at second trigger times corresponding to the odd rows while the MEMS mirror rotates in the second rotation direction.

7. The light scanning system of claim 1, wherein:
the transmitter is configured to transmit a plurality of transmit light beams, and
the MEMS mirror is configured to steer the plurality of transmit light beams in a sinusoidal pattern and the macro scanner is configured to steer the plurality of transmit light beams linearly across the field of view.

8. A light scanning system, comprising:
a plurality of light sources configured to simultaneously transmit a plurality of light beams along a transmission path to produce a fan of transmit light beams;
a microelectromechanical system (MEMS) mirror arranged on the transmission path and configured to oscillate about a first scanning axis to steer the fan of transmit light beams in a first dimension of a field of view;
a macro scanner arranged on the transmission path and on a receiver path, the macro scanner configured to rotate about a second scanning axis to steer the fan of transmit light beams in a second dimension of the field of view, wherein the macro scanner is further configured to receive from the field of view a fan of receive light beams that is produced from the fan of transmit light beams via backscattering, and wherein the macro scanner is configured to direct the fan of receive light beams further along the receiver path;
an array of photodetectors arranged on the receiver path and configured to receive the fan of receive light beams from the macro scanner and generate a plurality of measurement signals based on the fan of receive light beams; and
a receiver mirror arranged on the receiver path between the macro scanner and the array of photodetectors, wherein the receiver mirror is configured to receive the receive light beams from the macro scanner and direct the receive light beams at the array of photodetectors.

9. The light scanning system of claim 8, wherein the macro scanner is a polygon mirror having a plurality of reflective sides.

10. The light scanning system of claim 9, wherein:
the plurality of reflective sides are configured to receive the fan of transmit light beams from the MEMS mirror and direct the fan of transmit light beams into the field of view as the macro scanner rotates, and
the plurality of reflective sides are configured to receive the fan of receive light beams from the field of view and direct the fan of receive light beams towards the array of photo detectors as the macro scanner rotates.

11. The light scanning system of claim 8, wherein the macro scanner is a prism.

12. The light scanning system of claim 8, wherein the macro scanner is configured to continuously rotate 360° about the second scanning axis to steer the fan of transmit light beams in the second dimension.

13. The light scanning system of claim 8, wherein the macro scanner is arranged downstream from the MEMS mirror along the transmission path.

14. The light scanning system of claim 8, wherein the MEMS mirror is configured to steer the fan of transmit light beams in a sinusoidal pattern and the macro scanner is configured to steer the fan of transmit light beams linearly across the field of view.

15. The light scanning system of claim 8, wherein each photodetector of the array of photodetectors is configured to receive a different one of the receive light beams received in the fan of receive light beams.

16. The light scanning system of claim 15, wherein the array of photodetectors is configured to generate a plurality of measurement signals in parallel in response to receiving the fan of receive light beams.

17. The light scanning system of claim 8, wherein the fan of transmit light beams is a line having an elongated dimension that extends in the second dimension.

18. The light scanning system of claim 8, further comprising:
a controller configured to configure a scanning pattern comprising a grid of transmission coordinates, the grid of transmission coordinates comprising odd rows and even rows, wherein each transmission coordinate has a first beam angle component in the first dimension and a second beam angle component in the second dimension,
wherein the controller is configured to control the transmitter to transmit a plurality of fans of transmit light beams at different trigger times to transmit the plurality fans of transmit light beams at different transmission coordinates.

19. The light scanning system of claim 18, wherein:
the MEMS mirror is configured to oscillate between a first rotation direction and a second rotation direction as it oscillates about the first scanning axis,
the controller is configured to trigger first fans of transmit light beams of the plurality fans of transmit light beams at first trigger times corresponding to the even rows while the MEMS mirror rotates in the first rotation direction, and
the controller is configured to trigger second fans of light beams of the plurality of fans of transmit light beams at second trigger times corresponding to the odd rows while the MEMS mirror rotates in the second rotation direction.

20. The light scanning system of claim 1, wherein the receiver mirror comprises at least a plate beam splitter.

* * * * *